US011881730B2

(12) United States Patent
Polu et al.

(10) Patent No.: US 11,881,730 B2
(45) Date of Patent: Jan. 23, 2024

(54) WIRELESS CHARGING USING TIME-DIVISION MULTIPLEXING

(71) Applicant: Google LLC, Mountain View, CA (US)

(72) Inventors: Veera Venkata Siva Nagesh Polu, Mountain View, CA (US); Liang Jia, Palo Alto, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 16/975,350

(22) PCT Filed: Sep. 6, 2019

(86) PCT No.: PCT/US2019/049992
§ 371 (c)(1),
(2) Date: Aug. 24, 2020

(87) PCT Pub. No.: WO2021/045780
PCT Pub. Date: Mar. 11, 2021

(65) Prior Publication Data
US 2023/0105296 A1 Apr. 6, 2023

(51) Int. Cl.
*H02J 7/00* (2006.01)
*H02J 50/90* (2016.01)
(Continued)

(52) U.S. Cl.
CPC ............ *H02J 50/90* (2016.02); *H02J 7/0013* (2013.01); *H02J 50/12* (2016.02); *H02J 50/40* (2016.02)

(58) Field of Classification Search
CPC .. H02J 50/12; H02J 50/40; H02J 50/90; H02J 7/0013
(Continued)

(56) References Cited

U.S. PATENT DOCUMENTS

| 2010/0181961 A1* | 7/2010 | Novak | H01F 38/14 |
| | | | 320/108 |
| 2010/0270970 A1* | 10/2010 | Toya | H02J 50/80 |
| | | | 320/108 |

(Continued)

FOREIGN PATENT DOCUMENTS

| CN | 104253462 | 6/2013 |
| EP | 3072214 | 9/2016 |
| WO | WO 2014/176838 | 11/2014 |

OTHER PUBLICATIONS

PCT International Preliminary Report of Patentability in International Appln. No. PCT/US2019/049992, dated Mar. 17, 2022, 10 pages.

(Continued)

*Primary Examiner* — Zixuan Zhou
(74) *Attorney, Agent, or Firm* — Fish & Richardson P.C.

(57) ABSTRACT

Methods, systems, and apparatus, including computer programs encoded on computer-storage media, for wireless charging using time-division multiplexing. In some implementations, a wireless charger is configured to concurrently charge multiple devices by providing power wirelessly to individual devices in different time periods. The wireless charger can perform time-division multiplexing by selectively directing the output of a single driver circuit to different power transfer coil segments at different times. The wireless charging sessions of multiple devices can be maintained by repeating a pattern of activating different power transfer coil segments one by one in successive time periods.

20 Claims, 4 Drawing Sheets

(51) Int. Cl.
*H02J 50/12* (2016.01)
*H02J 50/40* (2016.01)

(58) Field of Classification Search
USPC .......................................... 307/104; 320/108
See application file for complete search history.

(56) References Cited

U.S. PATENT DOCUMENTS

| | | | |
|---|---|---|---|
| 2012/0169293 A1* | 7/2012 | Won | H04W 48/20 |
| | | | 320/137 |
| 2016/0056664 A1* | 2/2016 | Partovi | H02J 7/0042 |
| | | | 307/104 |
| 2016/0072334 A1* | 3/2016 | Wu | H02J 50/12 |
| | | | 320/108 |
| 2016/0099613 A1 | 4/2016 | Bell et al. | |
| 2017/0047786 A1 | 2/2017 | Park et al. | |
| 2017/0288444 A1 | 10/2017 | Komulainen et al. | |
| 2019/0089195 A1* | 3/2019 | Wang | B60L 9/00 |
| 2019/0267828 A1* | 8/2019 | Goodchild | H02J 50/80 |
| 2019/0272943 A1 | 9/2019 | Leem et al. | |

OTHER PUBLICATIONS

PCT International Search Report and Written Opinion in International Appln. No. PCT/US2019/049992, dated Mar. 26, 2020, 16 pages.

\* cited by examiner

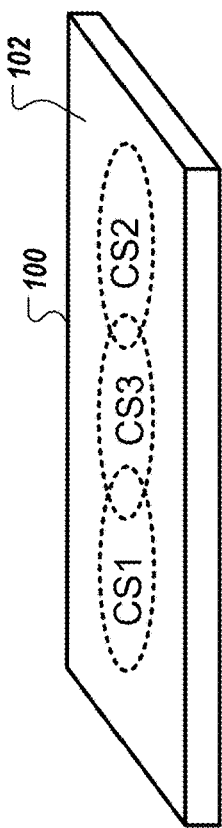
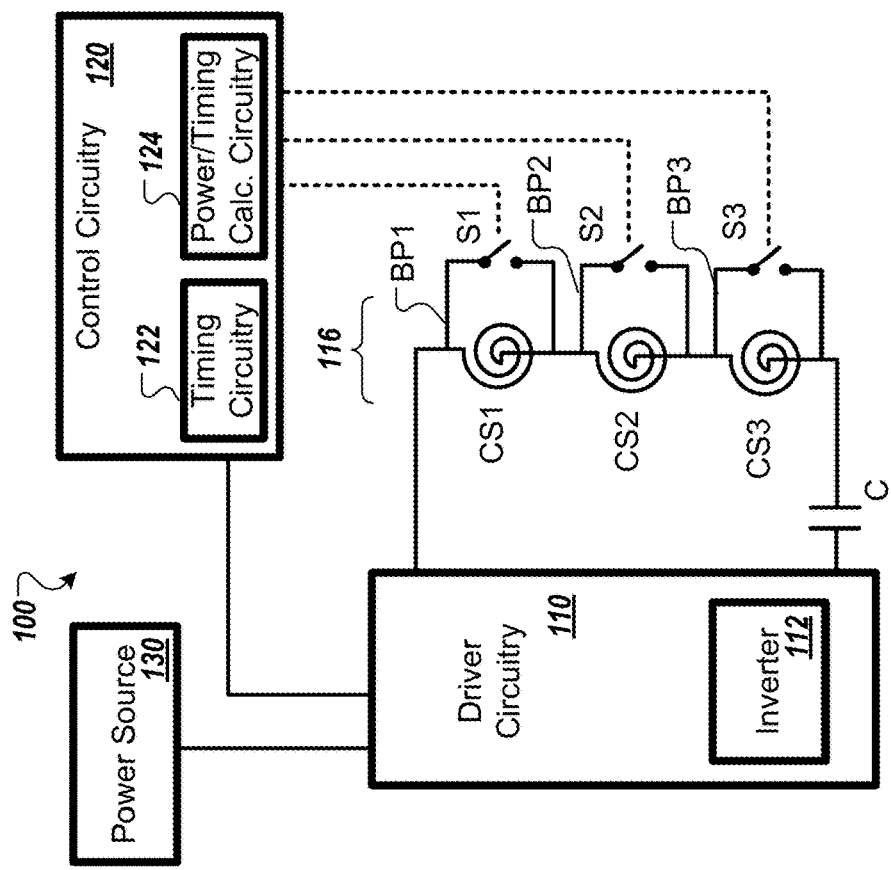
FIG. 1B
FIG. 1A

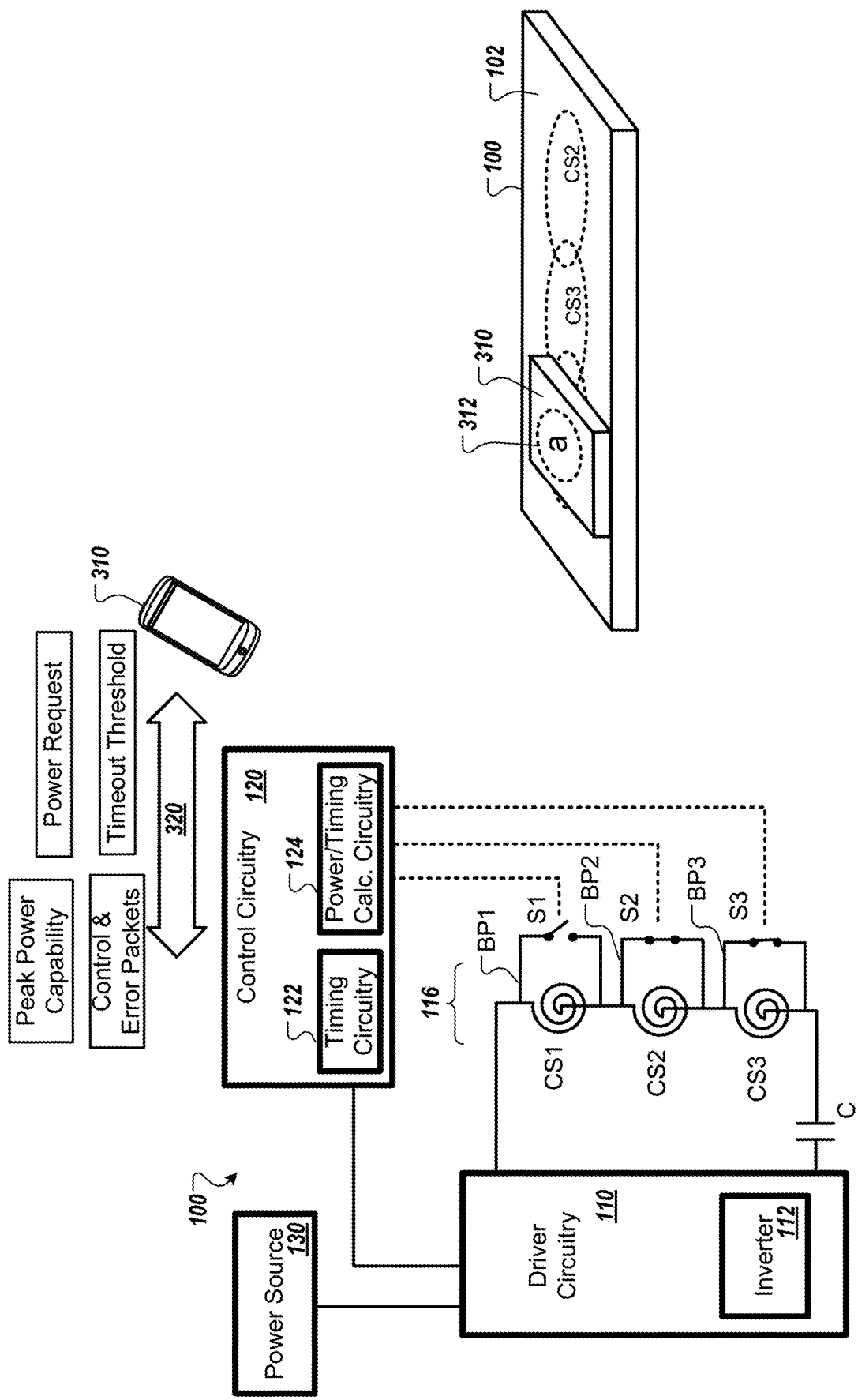

WIRELESS CHARGING USING TIME-DIVISION MULTIPLEXING

CROSS-REFERENCE TO RELATED APPLICATION

This application is a National Stage Application under 35 U.S.C. § 371 and claims the benefit of International Application No. PCT/US2019/049992, filed Sep. 6, 2019. The disclosure of the foregoing application is hereby incorporated by reference in its entirety.

TECHNICAL FIELD

The present specification relates to wireless power transfer.

BACKGROUND

Wireless charging techniques can be used to provide power from a charger to a wireless power receiver without a wired connection. For example, a power transmitting coil of a charger and a power receiving coil of a mobile device can be inductively coupled so that power is transferred from the charger to the mobile device.

SUMMARY

In some implementations, a wireless charger uses time-division multiplexing to transfer power wirelessly to multiple devices. For example, the wireless charger can use a single inverter or driver circuit, but alternate between charging different devices in different time periods. The wireless charger includes multiple power transmission coil segments, which may be separate coils or different portions of a single coil. The different coil segments are arranged at different locations on the wireless charger, allowing multiple devices to be placed on the wireless charger for charging at the same time. The wireless charger then varies which coil segments are energized, for example, by alternating among coil segments where devices to be charged have been placed. For example, if three devices are simultaneously placed on the wireless charger over three different coil segments, the wireless charger can repeat a series of charging cycles, where each charging cycle includes driving the first coil for a first period of time, driving the second coil for a second period of time, and driving the third coil for a third period of time. In this manner, the charger provides power through the multiple coil segments one at a time, e.g., in a round robin fashion.

Even though charging of a specific device is not continuous when multiple devices are charged concurrently, charging can be controlled so that, for each charging coil that has a device present, the amount of time between the periods of power transfer is less than a charging timeout period for the device being charged. In other words, the charger can maintain charging connections active for all devices present by setting the power transfer time periods to a sufficiently short duration that power transfer always resumes before the charging timeout period ends.

The wireless charger includes driver circuitry to energize the coil segments and control circuitry that causes the coil segments to transmit wireless power at different times. As a result, the wireless charger can alternate wireless power delivery between different coil segments. For example, the coil segments can be electrically connected in series with each other, and a single driver circuit can be used to provide a drive signal to all of the coil segments. To selectively charge specific coil segments, a bypass circuit path can be provided for each coil segment, to selectively route drive signals around the coil segment. As an example, the bypass circuit path can include a switch, e.g., one or more transistors, controlled by the control circuitry of the wireless charger. When the switch is open, the drive signal is routed directly through the coil segment and the coil segment is active, e.g., energized and transmitting power. When the switch is closed, the switch completes the connection along the bypass circuit path to provide a low-impedance path in parallel with the coil segment, so that most or virtually all of the drive signal is routed around the corresponding coil segment. The control circuitry can control the switches of the bypass circuit paths so that over the course of charging only one switch is open at a time, resulting in only one coil segment being active or fully energized a time. Generally, the current flowing through bypassed coil segments is minimal, often to the extent that bypassed coil segments do not transfer power sufficient to maintain a charging connection with a device. For example, the current through or output from bypassed coil segments may be less than 20%, less than 10%, or less than 5% of the current through or output from an active coil segment that is not bypassed.

The wireless charger can detect which coil segments have a chargeable device nearby in position for charging. When multiple devices are detected, the wireless charger selectively activates the charging coils using the bypass paths to alternate which coil segment is active and used to transmit power. For example, if two devices to be charged are detected, the charger will open and close the bypass paths to cause the two devices to be charged in alternating time periods.

In some implementations, communication between the charger and device being charged also occurs during the time slots or time periods that each device is assigned to receive power. For example, communication between the charger and a particular device may occur only during power transfer time slots assigned for that device, and may occur over the inductive link between the charger's power transmission coil and the device's power receiving coil. The charger may use the communication link to obtain information such as an amount of power requested by a device, a device type for the device, a charging timeout period for the device, and/or other information.

The techniques discussed in this document can provide one or more of the following advantages. For example, a charger can be able to concurrently charge multiple devices. This ability to charge multiple devices is provided even when the charger uses only a single inverter or driver circuit. Similarly, the resources of the driver circuit can be shared for all devices to be charged, for example, a modulator, a demodulator, a power capability, and so on of the power transmitter in the charger can be shared. These aspects allow for design simplicity and a low number of components, which can provide for a small size, low component count, and low cost.

In addition, the charger can allow charging of multiple devices concurrently without any mutual coupling between transmitters. The arrangement can maintain safety and foreign object detection even with concurrent charging of multiple devices. Each charging area of the charger, e.g., each coil segment of the charger, can be separately and independently measured and tested, allowing problems to be individually detected and localized. The charger can also facilitate manufacturing and reduce cost through the ability to charge multiple devices using a single coil assembly, e.g., with coil segments in series or even as a single integral coil with sub-coil wings or areas.

In one general aspect, a wireless charger is configured to charge a plurality of devices using time division multiplexing. The wireless charger comprises multiple power transmission coil segments, which are selectively activated at different times to concurrently charge the multiple devices. For example, output of a single driver can be routed to activate different power transmission coil segments at different times. The charger can be configured to perform charging by repeating a cycle in which each of multiple devices receives power through a corresponding transmission coil segment for only a portion of the cycle. The charger can activate the transmission coil segments one at a time so that a single device is charged at a time during charging sub-slots within the cycle.

In another general aspect, a method performed by a wireless charger includes: detecting multiple devices to be charged at the wireless charger; and charging the multiple devices using time division multiplexing. The charging can be achieved by scheduling time slots to charge the devices, with charging time slots of each device being interleaved among charging time slots for each of the other devices.

In another general aspect, a wireless charger includes: one or more wireless power transmission coils comprising a plurality of coil segments, each of the coil segments being arranged to transmit power at a different region of the wireless charger; drive circuitry configured to apply a drive signal to the one or more wireless power transmission coils; bypass circuit paths configured to route drive signals around the respective coil segments; switch elements configured to enable and disable the bypass circuit paths; and control circuitry configured to (i) detect the presence of devices to be charged at the different regions of the wireless charger, and (ii) control the switch elements such that, when devices to be charged are detected for at least two of the different regions, the wireless charger alternates between charging the devices at the least two different regions.

Implementations may include one or more of the following features. For example, in some implementations, the coil segments in the plurality of coil segments are electrically coupled in series with each other.

In some implementations, the coil segments in the plurality of coil segments are part of a single, monolithic coil.

In some implementations, the control circuitry is configured so that, to cause the wireless charger to alternate between charging the devices, the control circuitry is configured to control the switch elements to (i) enable each of bypass circuit paths except one, and (ii) vary which one of the bypass circuit paths is disabled.

In some implementations, the control circuitry is configured to concurrently charge the devices at the at least two different regions using time-division multiplexing to alternate between charging the devices.

In some implementations, the one or more wireless power transmission coils are a single wireless power transmission coil and the plurality of coils segments are portions of the single wireless power transmission coil. Each of the different bypass circuit paths is arranged to provide a circuit path in parallel with a different portion of the single wireless power transmission coil.

In some implementations, the control circuitry is configured to activate the bypass circuit paths to cause only one of the coil segments to transmit power at a time.

In some implementations, the control circuitry is configured to detect devices at the different regions based on interaction of the devices with the coil segments.

In some implementations, the control circuitry is configured to detect devices at the different regions by attempting communication using different coil segments in respective periods of time.

In some implementations, the control circuitry is configured to repeatedly cycle through activation of each of the different coil segments one by one.

In some implementations, the control circuitry is configured to: determine a frame structure comprising an assigned time period for each detected device; and repeat the frame structure so that each detected device communicates and/or receives power during its assigned time period in the frame structure.

In some implementations, the wireless charger is configured to alternate between charging the devices at the least two different regions at a rate such that charging resumes for each of the devices before the end of a charging timeout period for each of the devices.

In some implementations, the wireless charger is configured to: determine, through communication with the respective devices located at the at least two different regions, a charging timeout period for each of the respective devices; determine timing for alternating between charging the devices at the least two different regions so that, when alternating between charging the devices at the least two different regions, a time period in which the coil segment for a device is not activated is less than the charging timeout period.

In some implementations, the wireless charger is configured to: determine a wireless charging power requested by each of the devices located at the at least two different regions; and provide the requested wireless charging power levels by charging the devices using intermittent periods of charging at higher power levels than requested by the devices.

In some implementations, the wireless charger is configured to: determine when the devices at the at least two regions request differing wireless power transmission levels; and provide the differing wireless power transmission levels to the devices by (i) varying the power output of the drive circuitry to provide different transmission power levels in alternating power transmission periods, and/or (ii) using charging periods of different durations for the respective devices.

In some implementations, the driver circuitry is a single driver that provides drive signals for all of the plurality of coil segments.

In some implementations, one or more of the switch elements comprises back-to-back transistors.

In some implementations, the wireless charger is configured to perform wireless charging using time-division multiplexing to concurrently charge the devices at the at least two different regions.

In some implementations, the wireless charger is configured so that only one of the coil segments is activated at a time.

In some implementations, in at least one mode of operation involving charging of multiple devices, the control circuitry is configured to operate the switch circuitry to bypass all of the coil segments except one at any given time, and to vary which of the coil segments is not bypassed to provide power to the devices in alternating time periods.

In some implementations, the wireless charger is configured to alternate between charging the devices at the least two different regions such that the coil segments for the at least two regions are activated for periods of less than one second in duration.

In some implementations, the wireless charger is configured to alternate between charging the devices at the least two different regions such that the coil segments for the at least two regions are each activated for periods of less than one half of a second in duration.

In another general aspect, a method includes: detecting, by a wireless charger having multiple power transmission coil segments, two or more devices to be charged that are respectively located proximate different power transmission coil segments of the wireless charger; applying, by the wireless charger, a drive signal to the power transmission coil segments, the power transmission coil segments being coupled in series with each other; and in response to detecting the two or more devices, selectively bypassing the power transmission coil segments, by the wireless charger, to alternate between charging the two or more devices.

In some implementations, selectively bypassing the power transmission coil segments comprises varying which power transmission coils are bypassed to activate different transmission coil segments in alternating time periods.

In some implementations, selectively bypassing the power transmission coil segments comprises charging the two or more devices in a time-division multiplexing mode in which each of the power transmission coils is bypassed except one, and the power transmission coil that is not bypassed is varied by the wireless charger.

In some implementations, selectively bypassing the power transmission coil segments to alternate between charging the two or more devices comprises selectively bypassing the power transmission coil segments with respective low-impedance shunts that route the majority of current away from the corresponding power transmission coil segments.

In some implementations, the wireless charger includes only a single driver for the power transmission coil segments, and wherein applying the drive signal to the power transmission coil segments comprises applying a drive signal from only the single driver to the power transmission coil segments.

In some implementations, the power transmission coil segments are part of a single, monolithic power transmission coil.

In some implementations, the wireless charger comprises: drive circuitry configured to apply a drive signal to the one or more wireless power transmission coils; bypass circuit paths configured to route drive signals around the respective coil segments; and switch elements configured to enable and disable the bypass circuit paths.

In some implementations, each switch element comprises back-to-back transistors, e.g., two transistors arranged back-to-back to block current flow in both directions.

In some implementations, the method includes alternating between charging the two or more devices at a rate such that each of the two or more devices has a charging session that is maintained active as the wireless charger alternates between charging the two or more devices.

In some implementations, the method includes alternating between charging the two or more devices such that charging resumes for each of the two or more devices before the end of a charging timeout period for each of the two or more devices.

In some implementations, the method includes determining, through communication with the respective devices located at the at least two different regions, a charging timeout period for at least one of the two or more devices; and determining timing for alternating between charging the devices at the at least two different regions such that a time period in which the coil segment for a device is not activated is less than the charging timeout period.

In some implementations, detecting the two or more devices to be charged comprises sequentially attempting communication using different coil segments in respective periods of time.

Other embodiments of these aspects and other aspects disclosed herein include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1A is a diagram showing an example of a wireless charger that can be used to wirelessly transfer power to devices using time-division multiplexing.

FIG. 1B is a perspective view of the charger of FIG. 1A showing examples of positions of power transfer coil segments of the charger.

FIGS. 3A-3B are diagrams showing examples of the wireless charger interacting with a device to be charged.

Like reference numbers and designations in the various drawings indicate like elements.

DETAILED DESCRIPTION

Figure 2A:
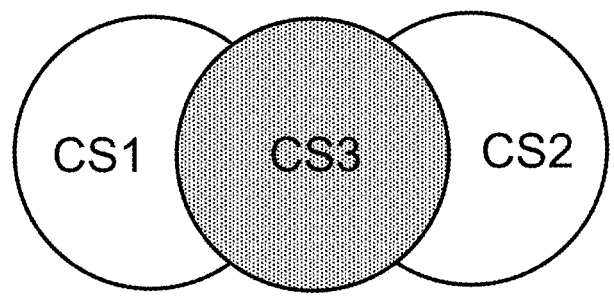
FIGS. 2A-2C are diagrams showing examples of arrangements of wireless power transfer coil segments for a wireless charger.

FIG. 1A is a diagram showing an example of a wireless charger 100 that can be used to wirelessly transfer power to devices using time-division multiplexing. FIG. 1B is a perspective view of the charger 100 of FIG. 1A showing examples of positions of wireless power transfer coil segments CS1-CS3 of the charger 100.

The charger 100 includes driver circuitry 110, control circuitry 120, and one or more wireless power transmission coils 116 that provide multiple coil segments CS1-CS3. The coil segments CS1-CS3 can be used to charge multiple devices concurrently, e.g., with a different device able to be charged by each different coil segment CS1-CS3. The charger 100 can activate the coil segments CS1-CS3 one by one in a repeating pattern to charge devices using time-division multiplexing.

Each coil segment CS1-CS3 has a corresponding bypass path BP1-BP3 that can be selectively enabled and disabled by the control circuitry 120. As discussed further below, the control circuitry 120 can use the bypass paths BP1-BP3 to vary which of the different coil segment CS1-CS3 transmits power at any given time. In particular, the control circuitry 120 can use the bypass paths BP1-BP3 to cause only one coil segment CS1-CS3 to be active at any given time, and to change which of the coil segments CS1-CS3 is active at different time periods. The control circuitry 120 can thus control the bypass paths BP1-BP3 to control the coil segments CS1-CS3 to respectively provide power in separate time slots assigned by the control circuitry 120.

The charger 100 can operate generally according to Wireless Power Consortium (WPC) QI inductive power transfer. For example, the resonant frequency of the transmitter and the receiver are roughly matched to about 100 kHz, although different resonant frequencies could be used.

In general, each of the coil segments CS1-CS3 can have roughly the same inductance. Typically, the inductance of a single coil segment CS1-CS3 is in a range from 1 µH to 10 µH.

When any of the coil segments CS1-CS3 detects an appropriate device to receive power, the control circuitry 120 adds that coil segment CS1-CS3 to the power transfer sequence. In the power transfer sequence, time slots are assigned between different coil segment CS1-CS3 based on the requested power of the respective devices, the received power of the respective devices, and/or the receiver power capability of the respective devices.

During charging, only one of the switches S1-S3 will be open (e.g., not conducting or off so that the corresponding coil is not bypassed). This allows the system to isolate charging to a single coil segment CS1-CS3 and a single device for a time period within the time-division multiplexing scheme. To protect against a short circuit or overload, the control circuitry 120 ensure that the switches S1-S3 are never all turned on at the same time. For example, the control circuitry can insert a period of dead time, when all of the switches S1-S3 are off, between each time slot in the time-division multiplexing scheme.

In further detail, the one or more wireless power transmission coils 116 include multiple power transmission coil segments CS1-CS3. The coil segments CS1-CS3 can be designed to charge devices at different locations on the wireless charger 100. As shown in FIG. 1B, the coil segments CS1-CS3 can be located within a housing of the charger 100, with the coil segments CS1-CS3 located at different positions along a charging surface 102 of the charger 100. The coil segments CS1-CS3 correspond to different locations on the charging surface 102 where devices can be placed The coil segments CS1-CS3 can partially overlap in location or area along the charging surface 102, as shown in FIG. 1B. This can facilitate the ease of placement of a device to be charged on the charging surface 102. For example, the charging surface 102 can include partially overlapping charging segments and thus avoid gaps where devices would not receive power, allowing the user to place a device to be charged anywhere in the region of the coil segments without needing to precisely align the device with a specific coil segment CS1-CS3. The charger 100 can then detect the device and select the coil segment CS1-CS3 providing the best inductive coupling. As discussed below, the charging pattern only activates one of the coil segments CS1-CS3 at a time, and so the charging coils do not electromagnetically interfere with each other during use despite the partially overlapping locations. Despite these potential advantages, advantageous chargers can be made without partially overlapping coil segments, and coil segments may optionally be placed at non-overlapping regions along the charger 100.

The coil segments CS1-CS3 are electrically connected in series with each other, and all of the coil segments CS1-CS3 may be connected to only a single driver circuit. In some implementations, the coil segments CS1-CS3 are all part of a single power transmission coil 116, for example, a single integral coil that has portions in different areas to provide the coil segments CS1-CS3. This arrangement can make manufacturing easier and lower costs.

Each of the coil segments CS1-CS3 has a corresponding bypass path BP1-BP3. The bypass paths BP1-BP3 are circuit routes located to be able to selectively shunt current around their respective coil segments CS1-CS3. For example, each bypass path BP1-BP3 can be a circuit segment in parallel with a single, specific coil segment CS1-CS3. Each bypass path BP1-BP3 has a switch S1-S3 that is controlled by the control circuitry 120. For example, the switch may include a transistor, two back-to-back transistors, or other switch elements. For example, each switch S1-S3 can be a pair of MOSFETs arranged back-to-back to block current in both directions. The bypass paths BP1-BP3 are configured so that when the switches S1-S3 are closed, the bypass paths BP1-BP3 have much lower impedance than the corresponding coil segments CS1-CS3. As a result, when one of the switches S1-S3 is closed, most or nearly all of the current flows through the closed bypass path BP1-BP3 instead of through the parallel-connected coil segment CS1-CS3.

The bypass paths BP1-BP3 allow the charger 100 to deactivate each coil segment CS1-CS3 by closing its bypass path BP1-BP3 and routing current around the coil segment. In this condition, the coil segments CS1-CS3 with the closed bypass segments BP1-BP3 will are deactivated, as they have minimal current flowing through them and thus will transfer little or no power. In addition, deactivated coil segments CS1-CS3 will produce little or no output to interfere with an active coil segment CS1-CS3 that is used to transmit power. The bypass paths BP1-BP3 also allow the charger 100 to activate each coil segment CS1-CS3 at an appropriate time by opening its bypass path BP1-BP3 and routing current through the coil segment CS1-CS3. In other words, when the switch S1-S3 fora coil segment CS1-CS3 is open, all of the current from the driver circuitry passes through that coil segment CS1-CS3, and the coil segment CS1-CS3 is active and transmits power.

When there are multiple devices on the surface 102 to be charged, the control circuitry 120 controls the operation of the switches S1-S3 to charge the multiple devices using time-division multiplexing. The control circuitry 120 controls the switches S1-S3 so that only one switch S1-S3 is open at a time, and thus only one coil segment CS1-CS3 is active at a time. The control circuitry 120 then changes the switch activations to vary which coil segment CS1-CS3 is active.

If there are three devices on the surface 102 ready to be charged, with one over each of the coil segments CS1-CS3, then the control circuitry 120 can cycle through all three in a round-robin fashion. For example, the control circuitry 120 activates coil segment CS1, then activates coil segment CS2, and then activates coil segment CS3, and then continues activating the coil segments CS1-CS3 sequentially in the same manner. For example, the coil segments CS1-CS3 may be sequentially activated for 200 millisecond (ms) time periods. As a result, each device to be charged receives power for 200 ms, then does not receive power for 400 ms (as the other two devices are charged in their respective periods), then again receives power in another 200 ms power transfer period.

If there are two devices on the surface 102 ready to be charged, the control circuitry 120 can alternate between activating the two coil segments CS1-CS3 where the two devices are located. For example, using 200 ms time periods, the control circuitry 120 can cause one of the coil segments CS1-CS3 to be active for a first 200 ms period, then cause a second of the coil segments CS1-CS3 to be active for a second 200 ms time period, then repeat this cycle in an ongoing manner.

When only a single device to be charged is present on the surface 102, the control circuitry 120 charges that device with a single coil segment CS1-CS3. For example, if the control circuitry 120 detects only a single device, located over coil segment CS1, then the control circuitry 120 opens the switch S1 so that the coil segment CS1 is active, e.g., with the entire drive current from the driver circuitry 110 passing through coil segment CS1. The control circuitry closes the switches S2 and S3 to route the drive current around coil segments CS2 and CS3, thus deactivating coil segments CS2 and CS3. With only a single device to be charged, the charger 100 does not need to change or multiplex which of the coil segments CS1-CS3 are active in order to carry out charging of the device. Nevertheless, the charger 100 can continue to perform multiplexing to enable detection of any additional devices that may be later placed on the surface 102. For example, as discussed below, the charger 100 can periodically or occasionally interrupt charging for brief periods to test whether a device has been placed at one or more other coil segments CS1-CS3.

The charger 100 can be configured to communicate, e.g., to exchange data with, devices to be charged. This communication may occur through the inductive coupling between a power receiving coil of a device to be charged and a power transmission coil segment CS1-CS3. For example, the charger 100 may send information using frequency modulation of the output from the coil segment CS1-CS3. As another example, the charger 100 may use amplitude modulation of the output from the coil segment CS1-CS3. The device to be charged may modulate the impedance of its power receiving coil to communicate information to the charger 100. Communication over the inductive coupling connection may occur in the time slots that the charger 100 assigns to the devices to be charged. For example, if a device is present at the coil segment CS1, then that device may receive information from and send information to the charger 100 during the time periods in which the coil segment CS1 is active (e.g., not bypassed because bypass path BP1 is open) while the coil segments CS2 and CS3 are deactivated (e.g., bypassed by their bypass paths BP2 and BP3 being closed).

In some implementations, the charger 100 may additionally or alternatively communicate with devices to be charged through communication channels separate from inductive coupling with the coil segments CS1-CS3. For example, the charger 100 may include a wireless radio-frequency transceiver to communicate with devices, e.g., via BLUETOOTH, WI-FI, or another communication protocol. When these communication channels are available, the charger 100 may not need to activate the coils in turn to detect the presence of device or receive charging requests and other information.

To detect the presence of devices to be charged, the control circuitry 120 can activate each coil segment CS1-CS3 in turn, cycling through the coil segments CS1-CS3 repeatedly in an attempt to detect electromagnetic coupling and/or communication from a nearby device. Accordingly, even when no devices to be charged have been detected yet, and power transfer is not occurring yet, the charger 100 can still cycle through the activation of the coil segments CS1-CS3 in an attempt to detect or communicate with any devices that may be newly placed on the charging surface 102.

In some modes of operation, time-division multiplexing wireless charging activates only the coil segments CS1-CS3 where devices to be charged are placed. For example, if devices are located at coil segments CS1 and CS3, the control circuitry 120 can skip the activation of coil segment CS2 to reserve charging time periods for only the coil segments where devices to be charged are actually present. Nevertheless, the control circuitry 120 can occasionally assign time periods the coil segment CS2 to be active, even though a device was not yet detected there, in order to detect whether a device to be charged has been newly placed there.

As another example, when only one device is present for charging, the control circuitry 120 can still periodically pause charging of the device for a brief period, e.g., by bypassing and thus deactivating the coil segment CS1 where the device is located, in order to briefly activate the other coil segments CS2 and CS3 one at a time. These other coil activations can be used to determine whether any device has been newly placed over the other coil segments CS2 and CS3, so the control circuitry 120 can begin charging devices there if appropriate. These checks for devices can be interspersed throughout the charging of the first device to check for the addition of new devices from time to time.

The control circuitry 120 may perform various functions to set and adjust the parameters for charging. As noted above, the control circuitry 120 can control the switches S1-S3 to carry out time-division multiplexing charging. The control circuitry 120 can also send commands to the driver circuitry 110, for example, to start and stop output to the coil segments S1-S3, to adjust a frequency or pattern of output to the coil segments S1-S3, to adjust the power level of output to the coil segments S1-S3, and so on. The control circuitry 120 may be implemented using any appropriate components, such as an application specific integrated circuit (ASIC), a power management integrated circuit (PMIC), a field-programmable gate array (FPGA), a microcontroller or other processor, discrete components, and/or other components. The control circuitry 120 may include a memory storing software, firmware, or other data or instructions to enable a processor or other device to carry out the functions discussed herein.

The control circuitry 120 can include timing circuitry 122 that can measure the passage of time, so that the control circuitry 120 determines when the power transfer periods begin and end. The timing circuitry 122 can include an oscillator, a clock generation circuit, or other components that indicate the passage of time in a predictable manner. In some implementations, the control circuitry 120 may receive a clock signal or other time-indicating signal from another component or system.

The control circuitry 120 can include power and timing calculation circuitry 124 which determines parameters such as power levels for the driver circuitry 110, desired durations for power transfer time periods, assignment of power transfer time periods to different coil segments CS1-CS3, and so on. The circuitry 124 can customize these parameters for the different situations that can occur, using information about the number of devices detected, requested power transfer levels of the devices, device types or device characteristics of the devices, charging timeout periods of the devices, power transfer efficiencies or levels of quality of inductive couplings with the devices, electrical capabilities and limits of the driver circuitry and the devices, and/or other information stored or obtained by the charger 100.

When one or more devices to charge are detected on the surface 102, the control circuitry 120 determines time slots in which to charge the respective devices. The control circuitry 120 can do this by generating a frame composed of time slots for activating different coil segments CS1-CS3. The frame may then be repeated in an ongoing manner while the charging needs of the devices remain. For example, if three devices are detected, then the frame may include three time slots, one for each of the different coil segments CS1-CS3. This would activate each of the coil segments CS1-CS3 in turn, thus charging each of the three devices in a round-robin manner. As another example, if two devices are detected, then the frame may include two time slots, one for each of the two coil segments CS1-CS3 where devices are present. Repeating this frame would alternate between charging the two devices.

Devices typically have predetermined timeout periods for power transfer, such that if wireless power transfer is interrupted for more than the timeout period, the power transfer session is terminated and the device and charger need to re-negotiate a new charging session. It is desirable that power transfer sessions continue without interruption when using time-division multiplexing charging, so the control circuitry 120 can set the parameters for charging to avoid exceeding the timeout periods.

The control circuitry 120 may obtain information about the power transfer timeout periods of devices that are placed on it for charging. For example, the charger 100 can request and receive a charging timeout value for each device, e.g., through data communication over the inductive coupling or through another communication channel. The charger 100 can also store values of typical or default charging timeout periods for different device types or for use if a timeout value cannot be obtained.

The charging circuitry 120 can also set the duration and pattern of power transfer time slots to avoid gaps in power transfer that would exceed the timeout periods of the respective devices. The charging circuitry 120 can determine the durations of time slots based on information about timeout periods using look-up tables, equations, logic elements, and so on. In some implementations, the charging circuitry 120 simply uses a predetermined duration for time slots that is set low enough to avoid triggering timeouts, even when multiple or all of the coil segments CS1-CS3 are used to charge devices. For example, in many cases, a predetermined time slot duration of 100 ms or 50 ms will maintain sessions active even when cycling through all of the coil segments CS1-CS3.

Consider the case where there are three devices to be charged, and the devices have a timeout period of 500 ms, e.g., a device terminates its charging session if power is not received for 500 ms or more. Using time-division multiplexing, each device will be charged for one time slot then not be charged for two time slots. To be able to maintain all of the charging sessions active during time-division multiplexing, the charging circuitry 120 can set the duration of the time slots to be less than 250 ms. For example, the charging circuitry 120 can set the duration of each time slot to be 200 ms. As a result, each device receives power for one time slot (e.g., 200 ms) and then does not receive power for two time slots (e.g., 400 ms). In this example, charging resumes each time after 400 ms, which is less than the 500 ms timeout, so the charging sessions continue to be active even though charging of each device is intermittent due the time-division multiplexing. The charging circuitry 120 may set the durations of the time slots as appropriate to avoid reaching the timeout thresholds. For example, if the timeout period were 250 ms, the charging circuitry may use 100 ms time slots.

The charging circuitry 120 can also use the power and timing calculation circuitry 124 to determine the appropriate power for the driver circuitry 110 to output to the coil segments CS1-CS3. Because charging of each device is not continuous, each device has proportionally less time for charging than if it were being charged alone. This requires an increase to the power level of the driver output to compensate for the lower amount of time the output is received. For example, if two devices to be charged each request charging at a 10 W rate, then, with time-division multiplexing, the driver circuitry 110 would need to provide output at 20 W. As a result, each device receives power at twice the requested rate (e.g., 20 W), but for half the time duration (e.g., half of every second that charging takes place), which results in an overall power transfer rate at the requested 10 W rate. As another example, when three devices each request power transfer at 10 W, the charging circuitry 120 may instruct the driver circuitry 110 to output power at a 30 W rate.

The charging circuitry 120 can take into account other factors to adjust the amount of power output by the driver circuitry 110. For example, the charging circuitry can determine power rate limits of the individual devices to be charged and/or the driver circuitry 110 and set the power level for output by the driver circuitry 110 to respect those limits. As another example, when inefficiencies or losses due to imperfect coupling result in less power being received than the devices request, the control circuitry 120 can increase the level of power output to compensate. For example, if two devices each request power at 10 W, and efficiency of transfer is 80%, the control circuitry 120 can set the power output from the driver circuitry 110 to 25 W to compensate for the inefficiency and deliver the desired 10 W to each device.

In some implementations, the charging circuitry 120 can set time slots of different durations for different devices. For example, if a first device requests power at 10 W and a second device requests power at 5 W, the charging circuitry 120 may set the power output of the driver circuitry 110 at 15 W, and set the charging time slot durations proportional to the requested power levels. Here, the ratio of power is 2:1, so the first device can have a time slot of 200 ms while the second device has a time slot of 100 ms. Thus the first device receives power at ⅔ of the 15 W rate and the second device receives power at ⅓ of the 15 W rate.

In some implementations, the control circuitry 120 may dynamically adjust the power output of the driver circuitry 110 so that different output levels are used for different time slots. For example, in addition to or instead of using different time slot durations, the power output for the time slots can be varied. For example, some device to be charged may be able to handle a higher instantaneous or peak power transfer rate than others. If a charger has five coil segments and five devices that each request to be charged at 10 W, one or more of the devices may not support charging with a 50 W output, even for a short duration. If a device does not support high charging rates even for short time slots, the power output may be reduced for that device, while using the higher charging rates for the time slots assigned to other devices that do support the higher charging rates.

As charging proceeds, the devices to be charged communicate with the charger 100 in their respective time slots. For example, devices can provide control and error packets (CEP) to the charger 100 through the inductive coupling with the coil segments CS1-CS3. Initially, devices to be charged report the power levels they desire. The device may also report parameters such as the peak or instantaneous power transfer rate that the device can handle, and/or the timeout period for the device. The control circuitry 120 then divides the charging time into time slots for charging based on the initial requests from the devices, e.g., using scheduling functionality of the power and timing calculation circuitry 124. During power transfer, the charger 100 and the devices can renegotiate the power levels needed. If the charger 100 cannot provide enough power to meet the needs of a device, perhaps due to reaching a thermal limit of the charger 100, the control circuitry 120 can limit the power level. Instead of a simple acknowledgment (ACK) of a device's power request, the control circuitry 120 can cause the charger 100 to provide a negative acknowledgement (NACK) message and indicate the level of power that is available.

In some implementations, the control circuitry 120 causes the charger 100 to indicate, to the devices being charged, the charging schedule or charging scheme. This can enable the devices to charge in an appropriate mode, and potentially to extend a timeout period used for charging.

The driver circuitry 110 can receive power from a power source 130. This power input may be direct current (DC) power from an AC/DC power adapter or another source. The driver circuitry can include an inverter 112, such as a single full-bridge driver. As discussed above, a single inverter 112 can be used in the charger 100.

In many wireless chargers, the highest efficiency is achieved when the resonant frequency of the transmitter is matched with the resonant frequency of the receiver. In the charger 100, a capacitor C is included in series with the coil segments CS1-CS3, forming an inductive-capacitive resonant tank. The inductance of the coil segments CS1-CS3 and the capacitance value of the capacitor C can be set so that the resonant frequency with all coil segments CS1-CS3 except one being bypassed will provide the appropriate resonant frequency for the target power receivers. For example, the combination of the capacitor C and any one of the coil segments CS1-CS3 can have a resonance frequency within a predetermined threshold, e.g., 20%, 10%, 5%, or 1%, of the resonance frequency fora receiver. Because the power transfer periods have all but one coil segment CS1-CS3 bypassed with very low-impedance bypass paths BP1-BP3, the resonance frequency and thus efficiency of power transfer is not significantly affected by the presence of the other coil segments CS1-CS3 not currently being used at any given point in time.

Figure 2B:
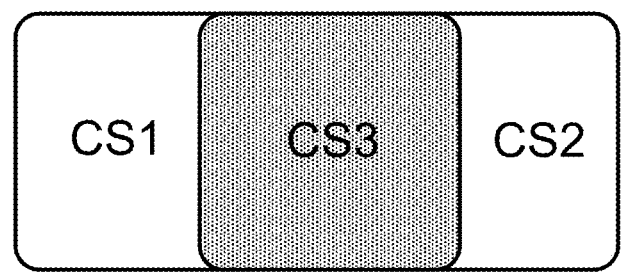
Figure 2C:
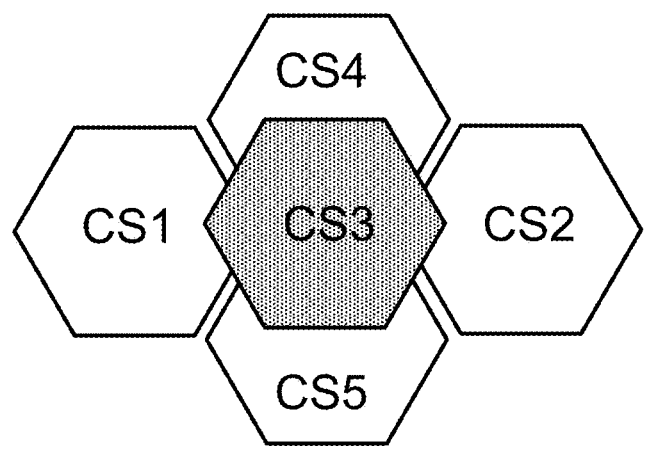

FIGS. 2A-2C are diagrams showing examples of arrangements of wireless power transfer coil segments for a wireless charger 100. FIG. 2A shows three coil segments CS1-CS3 that each cover a generally circular area. FIG. 2B shows three coil segments CS1-CS3 that each cover generally square areas. FIG. 2C shows five coil segments CS1-CS5 that each cover generally hexagonal areas. In each of FIGS. 2A-2C, at least some of the coil segments overlap, which can facilitate placement of devices on the charging surface.

FIGS. 3A-3B are diagrams showing examples of the wireless charger 100 interacting with a device 310 to be charged. In the example, a single device 310 is placed on the charging surface 102 over the coil segment CS1. As a result, the charger 100 provides power to the device 310 by routing drive signals through the coil segment CS1, while engaging the bypass paths BP2 and BP3 to shunt drive signals around the coil segments CS2 and CS3.

Initially, before the device 310 is detected, the charger 100 can periodically activate the individual coil segments CS1-CS3 in successive time periods to determine whether any device is present over each coil segment CS1-CS3. This can be done by scheduling time periods in which only a single switch S1-S3 is open, but varying which switch S1-S3 is open so that each coil segment CS1-CS3 has time periods in which it is the only coil segment not bypassed. Once the device 310 is placed over the coil segment CS1, during a period in which the coil segment CS1 is activated, the charger 100 detects the inductive coupling between the coil segment CS1 and a power receiving coil 312 in the device 310. The charger 100 and the device 310 also exchange data, for example, over the inductive coupling or another communication channel. This is illustrated in FIG. 3A with bidirectional communication arrow 320.

The device 310 and the charger 100 can exchange any appropriate data to establish, maintain, or adjust a charging session. For example, the device 310 may provide a power request or requested power amount. The device 310 may also provide data indicating other parameters or limits describing the charging modes or characteristics that the device 310 supports. For example, the device 310 may indicate a peak power capability for the wireless power receiver of the device 310, a timeout threshold for wireless charging, voltage or current limits, thermal status of the device 310, battery status of the device 310 (e.g., charge level), a device model or device type of the device 310, and so on. Once charging begins, the device 310 can provide control and error packets indicating amounts of power received, data indicating an efficiency or loss of the inductive link, adjustments to the amount of power requested, and so on. The charger 100 may send requests for these types of information or other information about the device 310. The charger 100 can also send acknowledgements, negative acknowledgements, and other messages. For example, the charger 100 and the device 310 may exchange data to enable determination of common charging modes supported by both the charger and the device 310. Similarly, they may exchange data to allow each to verify that the other is genuine or trusted device.

With only a single device 310 to be charged at the surface 102, the control circuitry 120 charges that device with the single coil segment CS1 that provides the best inductive coupling to the charger 100. In the example, the control circuitry 120 detects the device 310 located over coil segment CS1, and so the control circuitry 120 opens the switch S1 so that the coil segment CS1 is active, e.g., with the entire drive current from the driver circuitry 110 passing through coil segment CS1. The control circuitry closes the switches S2 and S3 to route the drive current around coil segments CS2 and CS3, thus deactivating coil segments CS2 and CS3. With only a single device 310 to be charged, the charger 100 does not need to change or multiplex which of the coil segments CS1-CS3 are active in order to carry out charging of the device 310.

In the example of FIGS. 3A-3B, charging time can be allocated exclusively to the device 310, although short time slots may be occasionally used for overhead, such as to activate coil segments CS2 and CS3 briefly to detect whether any devices are present. Thus, the control circuitry 120 can set the power output of the driver circuitry 110 based on the power requested by the device 310, with adjustments in output as needed in order to bring received power at the device 310 to the desired level.

FIGS. 4A-4D are diagrams showing an example of the wireless charger 100 concurrently providing power wirelessly to multiple devices 310, 410 using time-division multiplexing. Only a single charger 100 is used in the example, but the charger 100 is represented in several forms in the figures to show different aspects of the example.

Figure 4A:
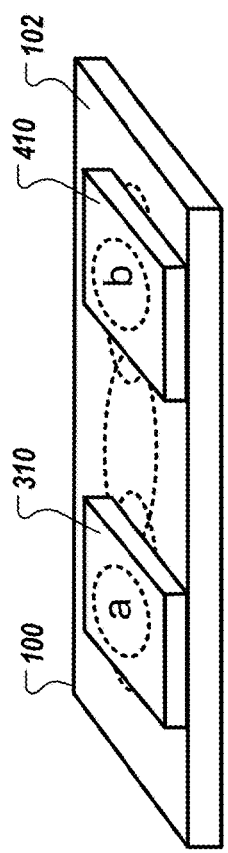
FIGS. 4A-4D are diagrams showing an example of the wireless charger concurrently providing power wirelessly to multiple devices using time-division multiplexing.
Figure 4B:
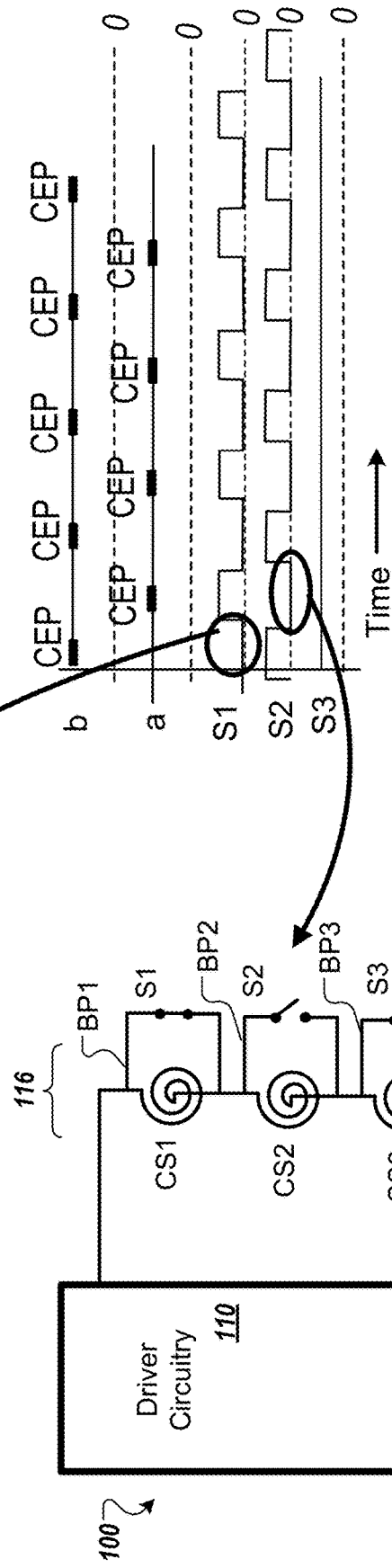
Figure 4C:
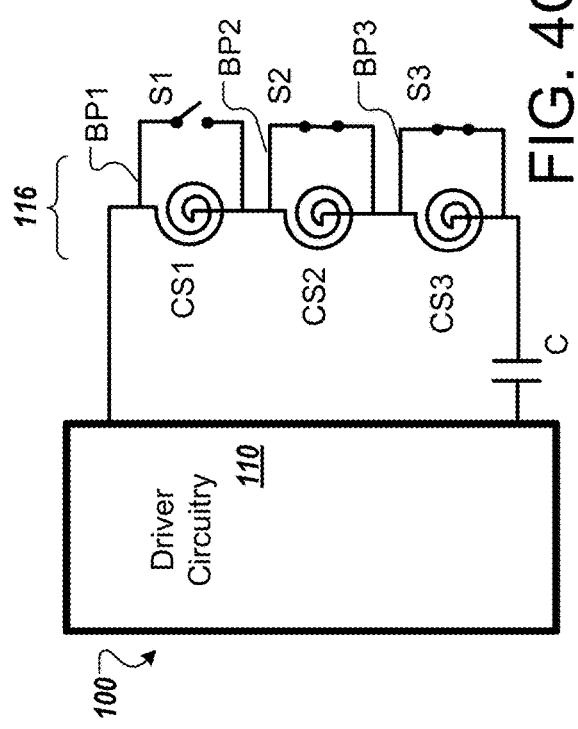
Figure 4D:
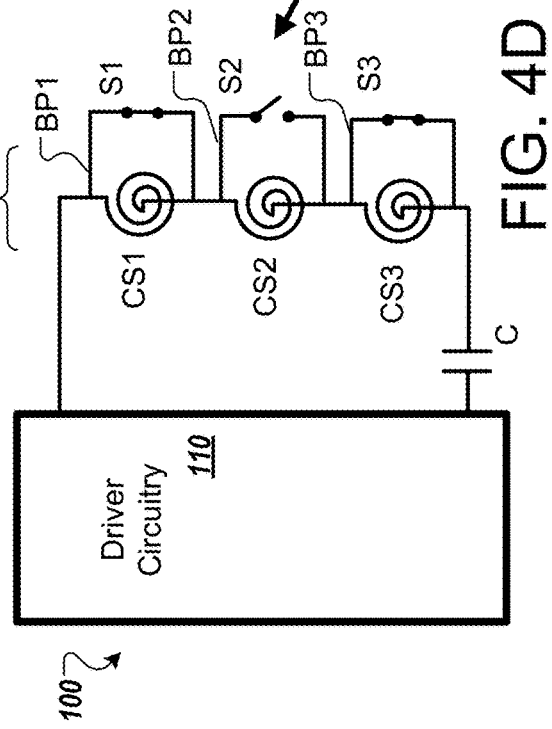

FIG. 4A shows a perspective view with two devices 310, 410 in position for charging. The device 310 (labelled "a") is placed over the charging coil CS1 and the device 410 (labelled "b") is simultaneously located over the charging coil CS2. As part of the same example, FIG. 4B provides a chart of activations of the switches S1-S3 over time, as well as an indication of time periods in which the devices 310, 410 respectively provide control and error packets (CEP) to the charger 100 over their respective inductive couplings. FIGS. 4C and 4D show a simplified schematic of the charger 100, with many of the elements from FIG. 1 omitted for clarity in illustration. FIG. 4C shows the positions of the switches S1-S3 during time periods in which the device 310 is being charged. FIG. 4D shows the positions of the switches S1-S3 during time periods in which the device 410 is being charged.

In this example, the charger 100 detects the presence of both devices 310, 410 and the respective coil segments CS1, CS2 where the devices 310, 410 have been placed. The charger 100 then determines a schedule that assigns time slots for charging to the different devices 310, 410. This results in charging occurring in a time-division multiplexing mode. In other words, charging for any given device 310, 410 occurs in an intermittent but predictable pattern as scheduled by the charger 100. In particular, in this example with two devices being charged concurrently, the charger 100 alternates between charging the two devices in short time slots. The charger 100 performs an ongoing pattern of switching between (i) a time slot in which only the device 310 is charged, e.g., when only the switch S1 is open, and (ii) a time slot in which only the device 410 is charged, e.g., when only the switch S2 is open.

This pattern is shown in FIG. 4B. The chart shows transistor control at a high level as closing a switch so it conducts, and a low level as the switch being open so it does not conduct current. The switch S3 is illustrated as remaining high over the time-scale illustrated. This is because no device to be charged is located at coil segment CS3, and so the charger 100 keeps the switch S3 closed and thus keeps the coil segment CS3 bypassed with the bypass path BP3 while the devices 310, 410 are being charged. FIG. 4B shows that the charger 100 alternates which of the switches S1 and S2 will be opened, while providing charging time slots when the switches S1 and S2 are respectively the only switches open. Thus the charger 100 alternates, in successive time slots, between having only the switch S1 open (FIG. 4C) and having only the switch S2 open (FIG. 4D).

FIG. 4B also shows the transmission of CEP data from the devices 310, 410 in their respective charging time slots. Each device 310, 410 transmits data to and/or receives data from the charger 100 in the period in which its corresponding coil segment CS1-CS3 is exclusively active. Thus the device 310 (device "a") transmits CEP data when the switch S1 is the only one of the switches S1-S3 that is open (FIG. 3C), and the device 410 (device "b") transmits CEP data when the switch S2 is the only one of the switches S1-S3 that is open (FIG. 3D). To facilitate the timing of this exchange, the charger 100 may provide information to the devices 310, 410 indicating the scheduling of charging time slots, and/or the charger 100 may provide a signal that the device's charging time slot is beginning and that CEP data can be sent.

In some implementations there may be time periods at the boundaries of the charging time slots when multiple switches S1-S3 are open simultaneously. This behavior may be desirable to avoid having all of the bypass paths BP1-BP3 active at once. Although not illustrated in FIG. 4B, the charger 100 can optionally insert guard or buffer time slots with different switch activations at transitions between charging time slots. For example, the charger can enforce certain switching rules when carrying out transitions between which coil segment CS1-CS3 is activated. For example, at each transition, the charger 100 may ensure that one or more switches S1-S3 is always maintained open, to avoid having all of the bypass paths BP1-BP3 active at once. This may be achieved in many different ways, such as by opening the switch S1-S3 for the charging time slot that is beginning before closing the switch that was open for the time slot that is ending. As another example, the charger 100 may insert short buffer time periods in which one or more or even all of the switches S1-S3 are open simultaneously, before the switches S1-S3 are closed as needed for the next charging time slot. These buffer time slots may be very short compared to the duration of charging time slots, e.g., buffer periods of 1 ms to 10 ms for charging periods that are 100 ms or more.

The control circuitry 120 of the charger 100 can determine and set the power output by the driver circuitry 100 for charging the devices 310, 410. The power output can be determined based on the charging power requested by each device 310, 410. For example, the control circuitry 120 can communicate with the devices 310, 410 to determine the power requested by each device. The control circuitry 120 can select a power for the driver circuitry 110 that is equal to or greater than a sum of all the charging powers requested. As a simple example, if both devices 310, 410 request to be charged at 10 W, the control circuitry can determine that at least 20 W of power output is needed, since each device 310, 410 will be assigned time slots representing no more than half of the charging time. As another example, if three devices requested power at 15 W, 10 W, and 5 W, respectively, then the control circuitry may determine that at least 30 W output of the driver circuitry is needed.

The charging circuitry 120 can adjust an initial output power amount determined from charging power requests to account for other factors, such as an adjustment to increase the power output to offset losses or inefficiencies resulting from the wireless coupling. The amount of these losses can be determined from indications of coupling quality or amounts of power received, which can be provided by the respective devices being charged on an ongoing basis during charging through the CEP data. For example, using CEP feedback data from the devices 310, 410, the control circuitry 120 may determine the power transfer efficiency of each of the devices 310, 410 and select the lowest efficiency to weight or adjust the power output. If the sum of power requested by the devices 310, 410 is 20 W, and the lowest power transfer efficiency is 70%, then the control circuitry 120 can determine that the power output should be set at 20 W/0.70=28.6 W to ensure sufficient power to meet the requests. Optionally, the requested power amounts for each device may be weighted by is power transfer efficiency for a more fine-grained calculation, e.g., for efficiencies of 70% and 85% respectively the power may be determined as 10 W/0.7+10 W/0.85=26.1 W.

The control circuitry 120 can store and use information indicating a maximum power output of the driver circuitry 110. With this information, the control circuitry 120 can set the power output to be no more than the maximum power capability of the driver circuitry 110. The control circuitry 120 can indicate to the respective devices 310, 410 when power capability is not sufficient to meet the request of a device 310, 410. In a similar manner, the control circuitry 120 can set the driver circuitry output power levels to respect the peak power handling capabilities of the devices 310, 410. This can be significant as larger numbers of devices are charged concurrently with time-division multiplexing on a single charger 100, and thus the peak or instantaneous power delivery may be much more (e.g., potentially several times more) than the average power requested by a device.

As discussed above, the control circuitry 120 may set the duration of the charging time periods, e.g., the periods of exclusively activating a single coil segment CS1-CS3 for a device 310, 410 to be charged, to avoid gaps in charging for any of the devices 310, 410 that would exceed a charging session timeout. This can be done using charging time slots of predetermined, short maximum durations. The durations can be short enough that even if the maximum number of devices are present, such that all coil segments CS1-CS3 have assigned time slots in a round-robin rotation, no device would experience a gap in charging that reaches a conservative timeout threshold. For example, if a charger has five coil segments, and charging timeouts are known to be at least 500 ms, the duration of each charging time slot may be set to be no more than 100 ms, so that even with all five coil segments used, the time between the end of a device's charging time slot and the beginning of the device's next charging time slot is only about 400 ms (e.g., 4 other devices times 100 ms maximum charging time slot duration).

In some implementations, the charger 100 adjusts or tunes the durations of the charging time slots based on information from the devices 310, 410. For example, the control circuitry 120 may obtain information about the power transfer timeout periods of devices 310, 410 that are placed on the charger 100 for charging. For example, the charger 100 can request and receive a charging timeout value for each device 310, 410, e.g., through data communication over the inductive coupling or through another communication channel. The charger 100 can also store values of typical or default charging timeout periods for different device types or for use if a timeout value cannot be obtained. The charging circuitry 120 can then set the duration and pattern of charging time slots to avoid gaps in power transfer that would exceed the timeout periods of the respective devices 310, 410. The charging circuitry 120 can determine the appropriate durations of time slots based on information about timeout periods using look-up tables, equations, logic elements, and so on. To the extent that devices 310, 410 need a minimum length of a charging time slot or a minimum amount of power transferred in a charging time slot to maintain a charging session, the charging circuitry 120 can take that into account in setting time slot durations as well.

The control circuitry 120 of the charger 100 can set differing durations of the charging time slots for different devices 310, 410 to achieve an appropriate rate of power transfer for each device 310, 410. Although the charging time slot durations for different devices 310, 410 charged concurrently may be equal, they are not required to be. In fact, it can be desirable to allocate charging time differently to different devices, either through differing numbers of charging time slots or different durations of assigned charging time slots, to better satisfy the power requests of the devices 310, 410. In some implementations, rather than change the duration of power transfer time slots, the control circuitry may dynamically adjust the power output of the driver circuitry, so that power transfer A number of implementations have been described. Nevertheless, it will be understood that various modifications may be made without departing from the spirit and scope of the disclosure. For example, various forms of the operations and functions shown above may be used, with steps re-ordered, added, or removed.

Embodiments of the invention and all of the functional operations described in this specification can be implemented using digital electronic circuitry, or in computer software, firmware, or hardware, including the structures disclosed in this specification and their structural equivalents, or in combinations of one or more of them. Embodiments of the invention, such as functions of the control circuitry of a charger, can be implemented as one or more computer program products, e.g., one or more modules of computer program instructions encoded on a computer readable medium for execution by, or to control the operation of, data processing apparatus.

The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A wireless charger comprising:
   one or more wireless power transmission coils comprising a plurality of coil segments, each of the coil segments being arranged to transmit power at a different region of the wireless charger;
   drive circuitry configured to apply a drive signal to the one or more wireless power transmission coils;
   bypass circuit paths configured to route drive signals around the respective coil segments;
   switch elements configured to enable and disable the bypass circuit paths; and
   control circuitry configured to (i) detect the presence of devices to be charged at the different regions of the wireless charger, and (ii) control the switch elements such that, when devices to be charged are detected for at least two of the different regions, the wireless charger alternates between charging the devices at the least two different regions;
   wherein the wireless charger is configured to (i) determine a charging timeout period for at least one of the devices and (ii) determine timing for alternating between charging the devices at the least two different regions so that, when alternating between charging the devices at the least two different regions, a time period in which the coil segment for a device is not activated is less than the charging timeout period for the device.

2. The wireless charger of claim 1, wherein the coil segments in the plurality of coil segments are electrically coupled in series with each other.

3. The wireless charger of claim 1, wherein the coil segments in the plurality of coil segments are part of a single, monolithic coil.

4. The wireless charger of claim 1, wherein the control circuitry is configured such that, to cause the wireless charger to alternate between charging the devices, the control circuitry is configured to control the switch elements to (i) enable each of bypass circuit paths except one, and (ii) vary which one of the bypass circuit paths is disabled.

5. The wireless charger of claim 1, wherein the control circuitry is configured to concurrently charge the devices at the at least two different regions using time-division multiplexing to alternate between charging the devices.

6. The wireless charger of claim 1, wherein the one or more wireless power transmission coils are a single wireless power transmission coil and the plurality of coils segments are portions of the single wireless power transmission coil, wherein each of the different bypass circuit paths is arranged to provide a circuit path in parallel with a different portion of the single wireless power transmission coil.

7. The wireless charger of claim 1, wherein the control circuitry is configured to activate the bypass circuit paths to cause only one of the coil segments to transmit power at a time.

8. The wireless charger of claim 1, wherein the control circuitry is configured to detect devices at the different regions based on interaction of the devices with the coil segments.

9. The wireless charger of claim 1, wherein the control circuitry is configured to detect devices at the different regions by attempting communication using different coil segments in respective periods of time.

10. The wireless charger of claim 1, wherein the control circuitry is configured to:
determine a frame structure comprising an assigned time period for each detected device; and
repeat the frame structure so that each detected device communicates and/or receives power during its assigned time period in the frame structure.

11. The wireless charger of claim 1, wherein the wireless charger is configured to determine the charging timeout period through communication with the respective devices located at the at least two different regions.

12. A method comprising:
detecting, by a wireless charger having multiple power transmission coil segments, two or more devices to be charged that are respectively located proximate different power transmission coil segments of the wireless charger;
determining, by the wireless charger, a charging timeout period for at least one of the two or more devices;
determining, by the wireless charger, timing for alternating between charging the two or more devices so that, when alternating between charging the two or more devices, a time period in which the coil segment for a device is not activated is less than the charging timeout period for the device;
applying, by the wireless charger, a drive signal to the power transmission coil segments, the power transmission coil segments being coupled in series with each other; and
in response to detecting the two or more devices, selectively bypassing the power transmission coil segments, by the wireless charger, to alternate between charging the two or more devices according to the determined timing.

13. The method of claim 12, wherein selectively bypassing the power transmission coil segments comprises varying which power transmission coils are bypassed to activate different transmission coil segments in alternating time periods.

14. The method of claim 12, wherein selectively bypassing the power transmission coil segments comprises charging the two or more devices in a time-division multiplexing mode in which each of the power transmission coils is bypassed except one, and the power transmission coil that is not bypassed is varied by the wireless charger.

15. The method of claim 12, wherein selectively bypassing the power transmission coil segments to alternate between charging the two or more devices comprises selectively bypassing the power transmission coil segments with respective low-impedance shunts that route the majority of current away from the corresponding power transmission coil segments.

16. The method of claim 12, wherein the wireless charger includes only a single driver for the power transmission coil segments, and wherein applying the drive signal to the power transmission coil segments comprises applying a drive signal from only the single driver to the power transmission coil segments.

17. The method of claim 12, wherein the power transmission coil segments are part of a single, monolithic power transmission coil.

18. The method of claim 12, wherein the wireless charger comprises:
drive circuitry configured to apply a drive signal to the one or more wireless power transmission coils;
bypass circuit paths configured to route drive signals around the respective coil segments; and
switch elements configured to enable and disable the bypass circuit paths.

19. The method of claim 12, wherein determining the charging timeout period comprises determining the charging timeout period for the two or more devices through communication with the two or more devices.

20. One or more non-transitory machine-readable media storing instructions that, when executed by one or more processors of a wireless charger, cause the wireless charger to perform operations comprising:
detecting, by a wireless charger having multiple power transmission coil segments, two or more devices to be charged that are respectively located proximate different power transmission coil segments of the wireless charger;
determining, by the wireless charger, a charging timeout period for at least one of the two or more devices;
determining, by the wireless charger, timing for alternating between charging the two or more devices so that, when alternating between charging the two or more devices, a time period in which the coil segment for a device is not activated is less than the charging timeout period for the device;
applying, by the wireless charger, a drive signal to the power transmission coil segments, the power transmission coil segments being coupled in series with each other; and
in response to detecting the two or more devices, selectively bypassing the power transmission coil segments, by the wireless charger, to alternate between charging the two or more devices according to the determined timing.

* * * * *